US012789098B2

(12) United States Patent
Varanese et al.

(10) Patent No.: US 12,789,098 B2
(45) Date of Patent: Nov. 10, 2026

(54) VIDEO GAME DEVELOPMENT ENGINE

(71) Applicant: Astroblox Inc., Los Altos, CA (US)

(72) Inventors: Alex Michael Varanese, Campbell, CA (US); Andrey Kurenkov, Palo Alto, CA (US); Kent Vainio, Palo Alto, CA (US); Ali Sadeghian, Los Altos, CA (US); Amir Sadeghian, Los Altos, CA (US)

(73) Assignee: Astroblox Inc., Los Altos, CA (US)

( * ) Notice: Subject to any disclaimer, the term of this patent is extended or adjusted under 35 U.S.C. 154(b) by 0 days.

(21) Appl. No.: 19/183,350

(22) Filed: Apr. 18, 2025

(65) Prior Publication Data

US 2026/0151707 A1 Jun. 4, 2026

Related U.S. Application Data

(60) Provisional application No. 63/712,305, filed on Oct. 25, 2024.

(51) Int. Cl.
*A63F 13/63* (2014.01)

(52) U.S. Cl.
CPC .................................... *A63F 13/63* (2014.09)

(58) Field of Classification Search
CPC ................................ A63F 13/60; A63F 13/63
See application file for complete search history.

(56) References Cited

U.S. PATENT DOCUMENTS

2017/0109933 A1* 4/2017 Voorhees .................. G06F 8/34
2017/0239576 A1* 8/2017 Hsiao ...................... A63F 13/63
2020/0159747 A1* 5/2020 Lindberg Baccarin Arnaut .......... G06F 16/285
2025/0217453 A1* 7/2025 Zuo ..................... G06F 18/2415
2025/0291615 A1* 9/2025 Paul ...................... G06F 16/434

* cited by examiner

*Primary Examiner* — Chat C Do
(74) *Attorney, Agent, or Firm* — Ashurst Perkins Coie US LLP; Colin Fowler; Aidan Faustina

(57) ABSTRACT

Disclosed herein are systems, methods, and non-transitory, computer-readable storage media for employing an artificial intelligence (AI) game building model to generate game content. A wish engine receives a wish, or natural language input describing desired game content, from a user and creates input data based on that wish. The game building model is directed, using the input data, to receive a basic tool associated with primitive code for implementing the desired game content from an ontology database. Primitive code based on the basic tool is then received by the wish engine from the game building model, converted into executable code, and sent to a game engine.

12 Claims, 8 Drawing Sheets

200

VIDEO GAME DEVELOPMENT ENGINE

CROSS-REFERENCE TO RELATED APPLICATIONS

This application claims the benefit of priority to U.S. Provisional Application No. 63/712,305, titled "VIDEO GAME DEVELOPMENT ENGINE," filed on Oct. 25, 2024. The content of the aforementioned application is herein incorporated by reference in its entirety.

TECHNICAL FIELD

The disclosure relates to artificial intelligence and, more particularly, to using artificial intelligence for electronic game development.

BACKGROUND

Video game development is the process of creating a video game. It is a multidisciplinary practice involving programming, design, art, audio, user interfaces, and writing. Each of those may be made up of more specialized skills; art includes 3D modeling of objects, character modeling, animation, visual effects, and so on. Development is supported by project management, production, and quality assurance. Teams can be many hundreds of people, a small group, or even a single person.

Game developers can make games using a number of commercial and open-source tools, such as game development tools. A game development tool is a specialized software application that assists or facilitates the making of a video game. Some tasks handled by game development tools include the conversion of assets (such as 3D models, textures, etc.) into formats required by the game, level editing, and script compilation. Both novice and experienced game developers can use game development tools to swiftly and simply convert their ideas into playable video games by saving game developers the time and effort of writing code for several monotonous jobs.

DETAILED DESCRIPTION

Figure 1:
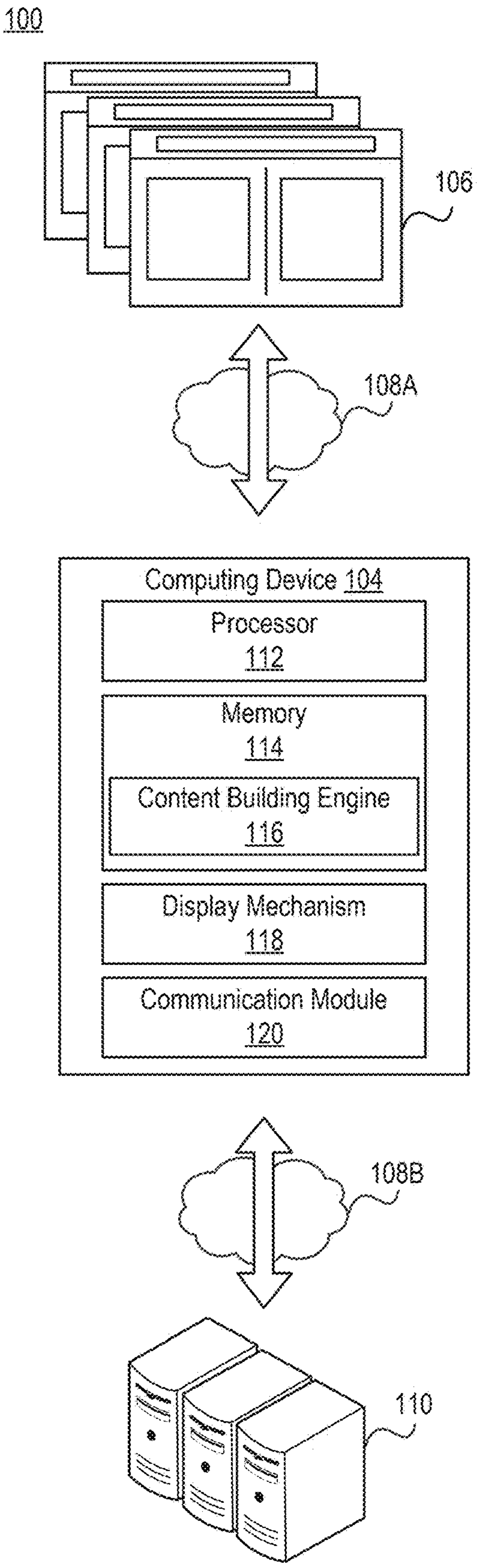
FIG. 1 illustrates an example of a network environment that includes a content building engine, according to an embodiment of the disclosed technology.

Game development tools can be used by game developers to create game content for new or existing video games. Game content may include any element of gameplay, such as game characters and items, how the characters and items move and/or interact, a virtual environment of the game characters and items, positioning or movement of a player point of view/camera, attributes or statistics connected to game objects, and the like. Existing game engines provide game developers with tools to generate game content more easily than by writing code for the game content. For instance, campaign editor tools and modification tools enable game developers to generate game content within the context of an existing game. However, these game engines are still difficult for novice game developers to navigate because game developers are constrained to the tools and functions enabled by the game engines. Thus, game developers may struggle to make new game content and new games using tools and functions limited to particular game contexts and game elements.

Embodiments of the present disclosure are directed at systems, methods, and architecture for employing an artificial intelligence (AI) model to generate game content. The AI model receives natural language describing "a wish." A wish is an AI query that includes user-generated text, content, and/or requests and describes the game content a game developer wants to create and/or modify. The AI model determines entities (e.g., visual objects within the game, such as characters or items), properties (e.g., basic characteristics of entities), events (e.g., actions entities can perform), and implementation (what happens to an entity or other entities when an event occurs) associated with the wish. The AI model generates primitive code representing the entities, properties, events, and implementation associated with the wish, which is converted to executable code that can be used in a game. The AI model acts as connective tissue between the entities, properties, events, and implementations such that the generation of each builds on the generation of those generated previously. The AI model accomplishes this generation by further interacting with a preconfigured ontology of tools that have premade primitive code for use in games. The AI model's selection of tools from the ontology is guided by examples of game content selected through retrieval-augmented generation (RAG) examples. Thus, by making wishes more granular, leveraging an ontology of primitive code, and applying RAG to select relevant examples of game content, the AI model allows game developers to develop game content that might not be available in current games or game developing tools at a faster pace than current systems allow.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others.

Similarly, various requirements are described that may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, using italics and/or quotation marks. The use of highlighting has no influence on the scope and meaning of a term; the scope and meaning of a term are the same in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Note that titles or subtitles may be used in the examples for the convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

FIG. 1 illustrates an example of a network environment 100 that includes a content building engine 116. Users can interact with the content building engine 116 via interfaces 106, as further discussed below. For example, users may be able to access interfaces that are designed to receive wishes describing desired game content. The interfaces can present game content generated by an AI model, and users can provide feedback regarding the game content such that the AI model can improve its game content generation based on the feedback.

As shown in FIG. 1, the content building engine 116 may reside in a network environment 100. Thus, the computing device 110 on which the content building engine 116 is executing may be connected to one or more networks 108*a-b*. The networks 108*a-b* can include personal area networks (PANs), local area networks (LANs), wide area networks (WANs), metropolitan area networks (MANs), cellular networks, the Internet, etc. Additionally or alternatively, the computing device 110 can be communicatively coupled to other computing devices over a short-range wireless connectivity technology, such as Bluetooth®, Near Field Communication (NFC), Wi-Fi® Direct (also referred to as "Wi-Fi P2P"), and the like. For example, if the computing device 104 is a mobile phone, then the computing device may be connected to a computer server of a server system 110 via the Internet. As another example, if the computing device 110 is a computer server 110, then the computing device 104 may be accessible to users via respective computing devices that are connected to the Internet via LANs.

The interfaces 106 may be accessible via a web browser, desktop application, mobile application, or over-the-top (OTT) application. For example, a user may be able to access interfaces that are designed to receive wishes, present generated game content, receive feedback regarding game content, and the like. Accordingly, the interfaces 106 may be viewed on various computing devices depending on the nature of the content building engine 116 and its deployment. Examples of computing devices include desktop computers, laptop computers, tablet computers, mobile phones, wearable electronic devices (e.g., watches or other accessories), mobile workstations (also referred to as "computer carts"), network-connected electronic devices (e.g., televisions or home assistant devices), virtual or augmented reality systems (e.g., head-mounted displays), and the like.

Generally, the content building engine 116 is hosted, at least partially, on the computing device 104 that is responsible for generating and/or displaying game content, as further discussed below. For example, the content building engine 116 may be embodied as a mobile application executing on a mobile phone or tablet computer. In such embodiments, the instructions that, when executed, implement the content building engine 116 may reside largely or entirely on the mobile phone or tablet computer. Note, however, that the mobile application may be able to access a server system 110 on which other aspects of the content building engine 116 are hosted.

In some embodiments, aspects of the content building engine 116 are executed by a cloud computing service operated by, for example, Amazon Web Services®, Google Cloud Platform™, or Microsoft Azure®. Accordingly, the computing device 104 may be representative of a computer server that is part of a server system 110. Often, the server system 110 comprises multiple computer servers. These computer servers can include information regarding computer-implemented models (or simply "models") that generate game content based on user-input wishes.

The computing device 104 can include a processor 112, memory 114, and display mechanism 118. In some embodiments, the computing device 104 can include additional or alternative components to those shown in FIG. 1. Each of these components is discussed in greater detail below.

Those skilled in the art will recognize that different combinations of these components may be present depending on the nature of the computing device 104. For example, if the computing device 104 is a computer server that is part of a server system (e.g., server system 110 of FIG. 1), then the computing device 104 may not include the display mechanism 118, though the computing device 104 may be communicatively connectable to another computing device that does include a display mechanism 118.

The processor 112 can have generic characteristics similar to general-purpose processors, or the processor 112 may be an application-specific integrated circuit (ASIC) that provides control functions to the computing device 104. The processor 112 can be coupled to all components of the computing device 200, either directly or indirectly, for communication purposes.

The memory 114 may comprise any suitable type of storage medium, such as static random-access memory (SRAM), dynamic random-access memory (DRAM), electrically erasable programmable read-only memory (EEPROM), flash memory, or registers. In addition to storing instructions that can be executed by the processor 112, the memory 114 can also store data generated by the processor 112 (e.g., when executing the modules of the content building engine 116) and produced, retrieved, or obtained by the other components of the computing device 104. Note that the memory 114 is merely an abstract representation of a storage environment. The memory 114 could comprise actual memory integrated circuits (also referred to as "chips").

The display mechanism 118 can be any mechanism that is operable to visually convey information to a user. For example, the display mechanism 118 may be a panel that includes light-emitting diodes ("LEDs"), organic LEDs, liquid crystal elements, or electrophoretic elements. In some embodiments, the display mechanism 118 is touch-sensitive. Thus, a user may be able to provide input to the content building engine 116 by interacting with the display mechanism 118. Alternatively, the user may be able to provide input to the content building engine 116 through some other control mechanism communicatively coupled to the computing device 104.

The communication module 120 may be responsible for managing communications external to the computing device 104. For example, the communication module 120 may be responsible for managing communications with other computing devices (e.g., server system 110). The communication module 120 may be wireless communication circuitry that is designed to establish communication channels with other computing devices. Examples of wireless communication circuitry include 2.4 gigahertz ("GHz") and 5 GHz chipsets compatible with Institute of Electrical and Electronics Engineers ("IEEE") 802.11—also referred to as "Wi-Fi chipsets." Alternatively, the communication module 120 may be representative of a chipset configured for Bluetooth®, Near Field Communication ("NFC"), and the like. Some computing devices—like mobile phones and tablet computers—are able to wirelessly communicate via separate channels. Accordingly, the communication module 120 may be one of multiple communication modules implemented in the computing device 104.

For convenience, the content building engine 116 may be referred to as a computer program that resides within the memory 114. However, the content building engine 116 could comprise software, firmware, or hardware implemented in, or accessible to, the computing device 104. The content building engine 116 runs on computing device 104 to generate game content based on a wish. In some embodiments, the content building engine 116 runs fully or partially on computing device 110 or a server. However, for simplicity, the following description of the content building engine is described in relation to running on the computing device 104.

Game Building Model

Figure 2:
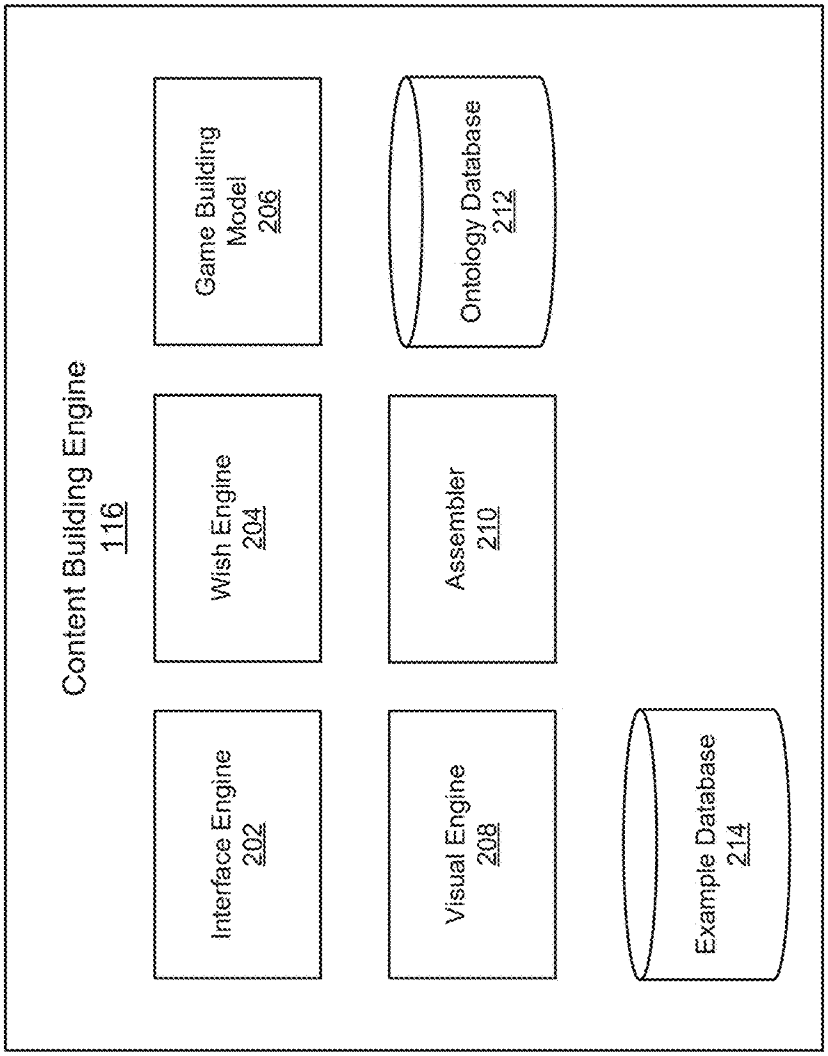
FIG. 2 illustrates a block diagram of the content building engine, according to an embodiment of the disclosed technology.

FIG. 2 illustrates a block diagram of the content building engine 116, according to an embodiment of the disclosed technology. Content building engine 116 generates game content based on one or more wishes. A wish is an input of text, content, and/or requests received by the computing device that serves as a natural language description of the game content that a user wants to create. For example, the wish may be as simple as a "jetpack" or more detailed, such as a "jetpack that can propel a game character vertically." In some embodiments, subsequent wishes are made automatically after an initial wish via the wish engine. For instance, a wish can be divided into a set of sub-wishes that could be viewed as distinct wishes if they had been input independently. For example, the wish "a jetpack with a pair of tennis shoes tied to it" could be broken into the subsequent wishes of "a jetpack" and "a pair of tennis shoes."

The content building engine 116 includes an interface engine 202, wish engine 204, game building model 206, visual engine 208, assembler 210, ontology database 212, and example database 214. The content building engine 116 may additionally or alternatively include a game engine that performs functions for running the back end of one or more games or creating three-dimensional or two-dimensional games or interactive simulations (for example, Unity, Unreal, CryEngine, Blender, GameMaker, Maya, or other suitable game engines known in the art). In some instances, the content building engine 116 is hosted on the computing device 104 that is separate, but in communication with, a computing device that hosts the game engine. The game engine can include a game builder runtime environment (GBRE) that can be used to create games and interactive simulations. The game engine is further described below in relation to FIG. 3.

The interface engine 202 generates graphical user interfaces (GUIs) that are sent for presentation to the display mechanism 118. A GUI can include interactive elements that a game developer can interact with via the display mechanism 118 or another input device physically or wirelessly connected to the computing device 104. One or more of the interactive elements can receive one or more interactions that represent a wish. For example, the interactive elements may represent a keyboard that a user can type a wish into. Additionally or alternatively, the interface engine 202 can receive the wish via one or more devices communicatively connected to the computing device 104, such as a keyboard or microphone. Upon receiving a wish from the display mechanism 118, the interface engine 202 sends the wish to the wish engine 204.

The wish engine 204 facilitates generating game content based on a wish using the game building model 206. The wish engine 204 receives wishes from the interface engine 202. The wish can include metadata describing settings for the game the wish is generating game content for, such as a type or game or coordinate system, as is further described below. In some instances, the wish engine 204 separates the wish into a set of sub-wishes. For example, a wish for "a hammer and a pickaxe" may be split into a sub-wish for "a hammer" and a sub-wish for "a pickaxe." The wish engine 204 can use the game building model 206 for one sub-wish at a time or may process the sub-wishes (as described below in relation to a singular wish) in parallel.

The wish engine 204 creates a set of input data for the game building model 206 using the wish. The input data can include the wish and ontology data related to the wish. The wish engine 204 retrieves ontology data from the ontology database 212. The ontology database 212 is a menu (e.g., a list of content) of basic tools that can be in a game environment. Basic tools are associated with primitive code representing simple steps (e.g., steps that can be taken to generate and/or modify game content) and/or simple elements (e.g., visual elements that entities within a game are made of). Simple steps include creation of virtual environments that may be articulated via coordinate systems, positioning or movement of player point of view/camera, instantiation of entities, adding or modifying attributes or statistics connected to entities, and singular movements of an entity in a game environment, such as translating the entity from one location to another (e.g., moving right, left, up, down, forward, backward), orienting the entity at a specific angle along a specific axis (e.g., roll, pitch, and yaw around an x-, y-, or z-axis), and the like. Simple elements include distinct shapes that form the visual appearance of an entity in a game environment, such as a square, a sphere, etc. Each tool in the ontology database 212 corresponds to code that implements the basic tool. For example, the tool of "moving forward" is associated with code that, when implemented for an entity, moves the entity forward in a game. In another example, the tool "ball" is associated with primitive code that describes a sphere. In some embodiments, the wish engine 204 retrieves an index of the tools stored with associated code in the ontology database 212 and includes the index in the input data.

In some embodiments, the ontology database 212 includes complex tools that are combinations of basic tools. For example, the tool "flapping" (e.g., of wings) is associated with the basic tool of "translating up" and "translating down." In another example, the tool "eating" is associated with the complex tool of "increasing health statistics," which is a combination of "increasing displayed level" on a health bar and "increasing speed" of a player. In another example, the complex tool of "person" is associated with the basic tools of "head," "arms," "torso," etc. In some embodiments, complex tools vary based on a combination of environment creation and camera positioning associated with a particular game type. For example, the complex tool "flapping" is made of a combination of two-dimensional tools for a side-scrolling game and a combination of three-dimensional tools for a three-dimensional virtual gaming environment. The ontology database 212 receives complex tools as part of premade packages of complex tools previously created from combinations of basic tools. In some embodiments, the ontology database 212 receives the premade packages via input to the computing device 104 (as described above) or from a server system 110 via networks 108*a-b*.

In some embodiments, the ontology database 212 can be categorized based on a type of game or coordinate system the game content will be used in, which may be included as metadata sent with the wish. Types of games include platformer (e.g., where the objective of the game is to move a character between points in an environment), top-down (e.g., where game levels are characterized from a top-down perspective), side-scrolling (e.g., where the game is viewed from a side-view camera angle such that the screen follows a character as the character moves right and left), and the like. In these embodiments, tools in the ontology database 212 match these types of games. For instance, particular tools correspond to a point of view of a player of a game for a particular game type. For example, tools of "moving forward," "moving backward," "moving up," and "moving down" correspond to a two-dimensional side-scrolling, whereas tools of "moving right" and "moving left" do not. As another example, tools of "rotating along z-axis" and "sphere" correspond to a three-dimensional game in which a player has a three-dimensional view of entities in the game.

The wish engine determines granular elements and granular actions described in the wish. The wish engine 204 parses the wish to extract words representing singular visual objects (e.g., granular elements) and singular events (e.g., granular actions) from the wish. For example, the wish engine 204 parses the granular elements of "jet" and "pack" from a wish for "a jetpack." In another example, the wish engine 204 can parse the granular action of "eating" and the granular elements of "bunny" and "carrot" from a wish for "a bunny eating a carrot." The wish engine 204 includes the granular elements and granular actions parsed from the wish in the input data.

The wish engine 204 inputs the input data to the game building model 206. The game building model 206 is an AI model trained to generate primitive code representing game content. The game building model 206 may be a large language model (LLM) or another type of AI model, as is described in relation to FIG. 8. In some embodiments, the game building model 206 can include multiple sub-models for entities, properties, events, and implementations, as shown in and described in relation to FIG. 3 below. In these embodiments, the game building model 206 generates primitive code at each sub-model that is used to generate further primitive code at subsequent sub-models.

The wish engine 204 employs retrieval-augmented generation (RAG) for the game building model 206. RAG is a framework that combines one or more information retrieval systems for the game building model 206 to improve the accuracy and relevance of the generated game content. RAG works by retrieving relevant information from external sources (e.g., the example database 214 and ontology database 212) and providing it to the game building model 206 as context for determining primitive code for game content. The wish engine 204 can use RAG in association with the input data to retrieve example data from the example database 214 for the game building model 206.

Example data describes previously generated game content. This game content may have been generated by the game building model 206 on the computing device 104, generated at other computing devices employing the game building model 206 (or a version thereof), or created manually by game developers. The example database 214 stores game content in relation to associated basic tools, complex tools, characteristics, and/or entities. Entities are visual objects included in game content that are granular elements or combinations of granular elements. For example, "palm," "tree," and "palm tree" are each different entities, where "palm" and "tree" are granular elements and "palm tree" is a combination of those two granular elements. The basic tools indicate what an entity of the game content can do and/or is made of. The characteristics indicate features or qualities of an entity, such as being "configurable," being an "item," and the like.

The wish engine 204 uses RAG to select examples from the example database 214 based on the granular elements and granular actions parsed from the wish. In some embodiments, the wish engine 204 uses RAG to retrieve examples with basic or complex tools that match a granular action or element from the wish, examples with one or more of the same characteristics of the previously retrieved examples, and the like. For example, the wish engine 204 may select the example of a "flying object" that can "take off," "soar," and "land" based on the granular element of "a fly." In another example, the wish engine 204 uses RAG to retrieve the granular action of "modifying player statistics" for a wish including the tool of "eating" based on "eating" being associated with the complex tool of "modifying player statistics" (e.g., increasing the health level of a player) in the example database 214. The wish engine 204 inputs the example data retrieved using RAG to the game building model 206.

The wish engine 204 receives primitive code for game content from the game building model 206 and inputs the primitive code to the assembler 210. The assembler converts the primitive code into byte code that is an executable version of the source code that runs in the game engine or inside the GBRE within the game engine, as is further described in relation to FIG. 3. For example, the executable code may be code specifying a user input that causes execution of the action represented by the primitive code. The assembler sends the executable code to a game engine or GBRE on the computing device 104 for use as game content.

The wish engine 204 can receive executable code used by the game engine or GBRE from the assembler 210, game engine, or GBRE. The visual engine 208 can generate visual data that corresponds to the game content. For example, the visual engine 208 may use game content that describes implementation of a jetpack (e.g., how the jetpack moves or cannot move or other constraints on actions performed by the jetpack) to generate executable code that depicts a jetpack moving based on the game content. The visual engine 208 can send the visual data to the game engine or GBRE for use with the game content in the game and can send the visual data to the wish engine. The wish engine 204 can receive and send the visual data to the game building model 206 for use in generating more game content.

Figure 3:
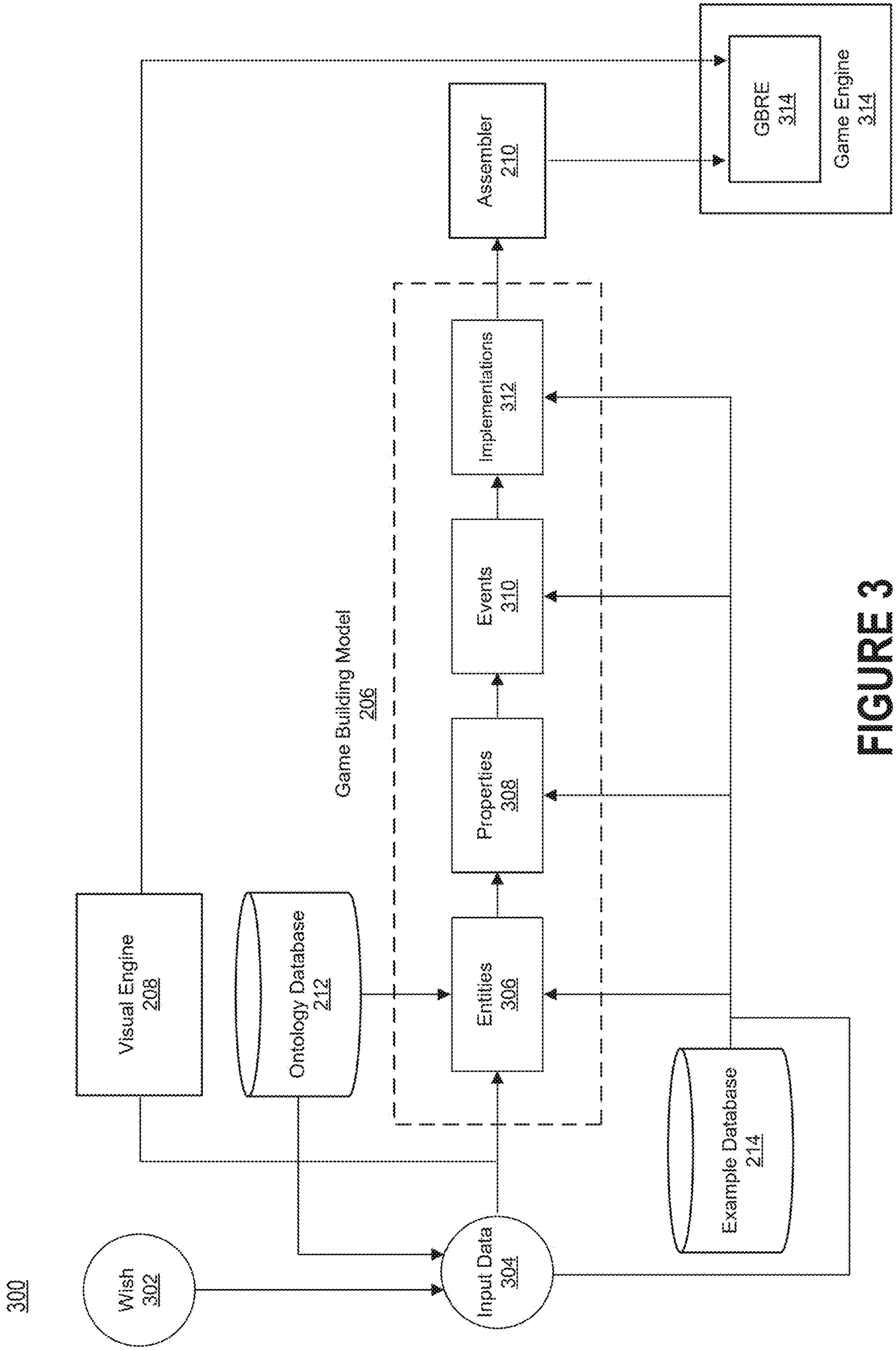
FIG. 3 illustrates a block diagram representing use of a game building model, according to an embodiment of the disclosed technology.

FIG. 3 illustrates a block diagram representing use of the game building model 206, according to an embodiment of the disclosed technology. The game building model 206 generates primitive code representing entities 306, properties 308, events 310, and implementations 312 using an entities sub-model, properties sub-model, events sub-model, and implementation sub-model. The game building model 206 generates primitive code at each sub-model that is used to generate code at subsequent sub-models. In additional or alternative instances, the sub-models may be ordered differently or may be combined into one or more models.

Upon receiving a wish 302, the wish engine 204 generates input data using the wish 302 and ontology data, as is described above in relation to FIG. 2. The wish engine 204 inputs the input data 304 to the entities sub-model of the game building model 206. The wish engine 204 also uses the input data 304 to extract example data for the entities sub-model using RAG. The wish engine 204 inputs the input data 304 and extracted example data to the entities sub-model, which determines primitive code describing entities 306. An entity 306 is a visual object included in the game content described in a wish 302 and which may comprise one or more granular elements. For example, a wish 302 for "a jetpack" is asking for the game building model 206 to create primitive code for a jetpack entity that can be used in a game. In some embodiments, each wish 302 has an entity 306 associated with it but may have more than one entity 306 in some instances.

The game building model 206 receives the input data 304 and extracted example data from the wish engine 204. The game building model 206 accesses the ontology database 212 to aid in generating primitive code representing one or more entities 306 via the entities sub-model. For example, the game building model 206 can select an example from the example data and modify the example data to include basic or complex tools from the ontology database 212 such that the modified example data describes the entity 306 being requested in the wish 302. For example, the game building model 206 can retrieve the primitive code that describes an "airplane" and a "backpack" for a wish 302 requesting a "jetpack" based on example data describing a "jet" and a "pack."

The game building model 206 validates that the primitive code can be used by the properties sub-model. For example, the game building model 206 can determine whether the primitive code would be able to run on its own, whether the primitive code has data needed to be used by the properties sub-model, whether the primitive code could be used for the type of game that the game content is being generated for, and the like. If the game building model 206 determines that the primitive code describing entities is validated, the game building model 206 inputs the primitive code to the properties sub-model internal to the game building model 206. The game building model 206 requests that the wish engine 204 use RAG to select example data for the properties sub-model based on the input data 304 and/or primitive code generated by the entities sub-model 306 or uses the example data previously extracted by the wish engine 204 via RAG.

The properties sub-model determines properties 308 associated with the primitive code generated by the entities sub-model. Properties 308 are the basic characteristics associated with each entity described by the primitive code. For example, the entity 306 "jetpack" may be associated with the properties 308 of being "wearable," an "item," "able to generate movement of other objects," and the like. The properties sub-model edits or adds to the primitive code describing entities 306 based on properties 308 described in the example data selected by the entities sub-model and/or extracted via RAG. For example, for the property 308 of being "wearable," the game building model 206 can retrieve the primitive code that describes a "backpack," "shirt," and "purse," which are each also associated with the property 308 of being "wearable," and modify the primitive code of the entities 306 to exemplify the property.

The game building model 206 validates that the primitive code output by the properties sub-model can be used by the events sub-model in a similar fashion to how the game building model 206 validated the primitive code from the entities sub-model. If the game building model 206 determines that the primitive code from the properties sub-model is validated, the game building model 206 inputs the primitive code from the properties sub-model into the events sub-model. In some instances, the game building model 206 also inputs the primitive code from the entities sub-model to the events sub-model.

The events sub-model determines events 310 associated with the primitive code generated by the properties sub-model 308. Events 310 are actions that each entity can take immediately and differ from properties 308 in that properties 308 are static (e.g., the entity always has the property 308), whereas events 310 can occur or not based on other triggering events 310 or conditions. The events sub-model edits or adds to the primitive code output by the properties sub-model based on basic or complex tools from the ontology database 212 such that the modified example data describes the events 310 the entity described in the primitive code can do. For example, the entity 306 "jetpack" can be associated with the events 310 of "flying," "turning on," "turning off," "using fuel," "moving up," and the like, which each are tools in the ontology database 212 associated with primitive code describing how the event occurs, based on the entity 306 "airplane" being associated with the same tools in the example database 214. In another example, the entity 306 "wings" can be associated with the events 310 of "flying," "getting tired," "flapping," "melting close to the sun," and the like based on example data selected by the game building model 206 included those tools as events. These examples illustrate that though both entities 306 are related to flying, the entities 306 have different associated events 310 that are combined in different ways.

The game building model 206 validates that the primitive code output by the events sub-model can be used by the implementation sub-model in a similar fashion to how the game building model 206 validated the primitive code from the entities sub-model and properties sub-model. If the game building model 206 determines that the primitive code from the events sub-model is validated, the game building model 206 inputs the primitive code from the events sub-model into the implementation sub-model. In some instances, the game building model 206 also inputs the primitive code from the properties sub-model and the primitive code from the entities sub-model to the implementation sub-model.

The implementation sub-model determines implementations 312 of the events 310 described in the primitive code generated by the events sub-model. Implementations 312 describe what happens to entities 306 other than the entity 306 performing an event 310 when the event 310 occurs. The implementation sub-model edits or adds to the primitive code implementations 312 described in the example data previously selected by the entities sub-model and/or extracted via RAG. For example, the implementation sub-model may associate the entity 306 "player" the implementation 312 of "moving up" when the event 310 "turning on" occurs for the entity 306 "jetpack" based on the same implementation 312 occurring for the entity "player" when the event 310 "turning on" occurs for the entity 306 "airplane." In another example, the implementation sub-model associates the entity "wings" with the implementation of "flapping" when the event of "moving" occurs for the entity "wings."

The game building model 206 validates that the primitive code generated by the implementation sub-model can be used by assembler 210 in a similar fashion to how the game building model 206 validated the primitive code from the entities, properties, and events sub-models. If the game building model 206 determines that the primitive code from the implementation sub-model is validated, the game building model 206 sends the primitive code to the assembler 210. In some embodiments, the game building model 206 also sends the primitive code from the entities, properties, and events sub-models to the assembler 210. The assembler 210 converts the primitive code to code that is runnable by the GBRE 314 and/or game engine 314 and sends the executable code to the GBRE 314 and/or game engine 314. The assembler 210 can also store the executable code in the example database 214 of use in RAG by the wish engine 204 or for further training of the game building model 206 or one or more of its sub-models.

Translation of granular elements and granular actions in wish 302 to ontology tools, as supported by example data, allows for the game building model 206 to use the same or similar tools to create primitive code representing different game content. For example, the primitive code for a first "translation" tool simulates the event 310 "flapping," whereas the primitive code for other "translation" tools simulates the event of "blasting off." As another example, the events of "using fuel" or "tiring" are associated with an "energy bar" entity 306, but the two events cause energy in the "energy bar" to be consumed differently (e.g., a "jetpack" consumes energy in bursts upon ignition and then uses upward momentum to continue moving the character upward without spending the energy bar, whereas "wings" that are flapping cause energy to drain from the energy bar at a constant rate).

The game engine 314 can send the executable code to the visual engine 208 for the generation of visual data to be used for the game. The visual engine 208 can send the visual data to the wish engine 204 for use by the game building model 206 or directly to the game building model 206 for further training.

The game engine 314 can receive feedback via the display mechanism 118 or communication module 120 as input by a user. The feedback can include whether the executable code worked, how satisfied the user was with the executable code, a rating of the executable code out of 10, or the like. The game engine can track additional signals that indicate feedback about the executable code, such as how often the executable code is used, how long a session the executable code was used in lasted, the stability of the executable code, and the like. The game engine 314 can store the feedback in relation to the example database 214 such that the feedback can be used to inform the game building model 206 during training or the wish engine 204 when using RAG. The wish engine 204 can train the game building model 206 using the examples database and/or ontology database 212 and/or visual data from the visual engine 208 upon request by a user received by the computing device 104, at specified time periods, whenever executable code or visual data is generated, etc. Training is further described in relation to FIG. 8.

Game Content Creation Processes

Figure 4:
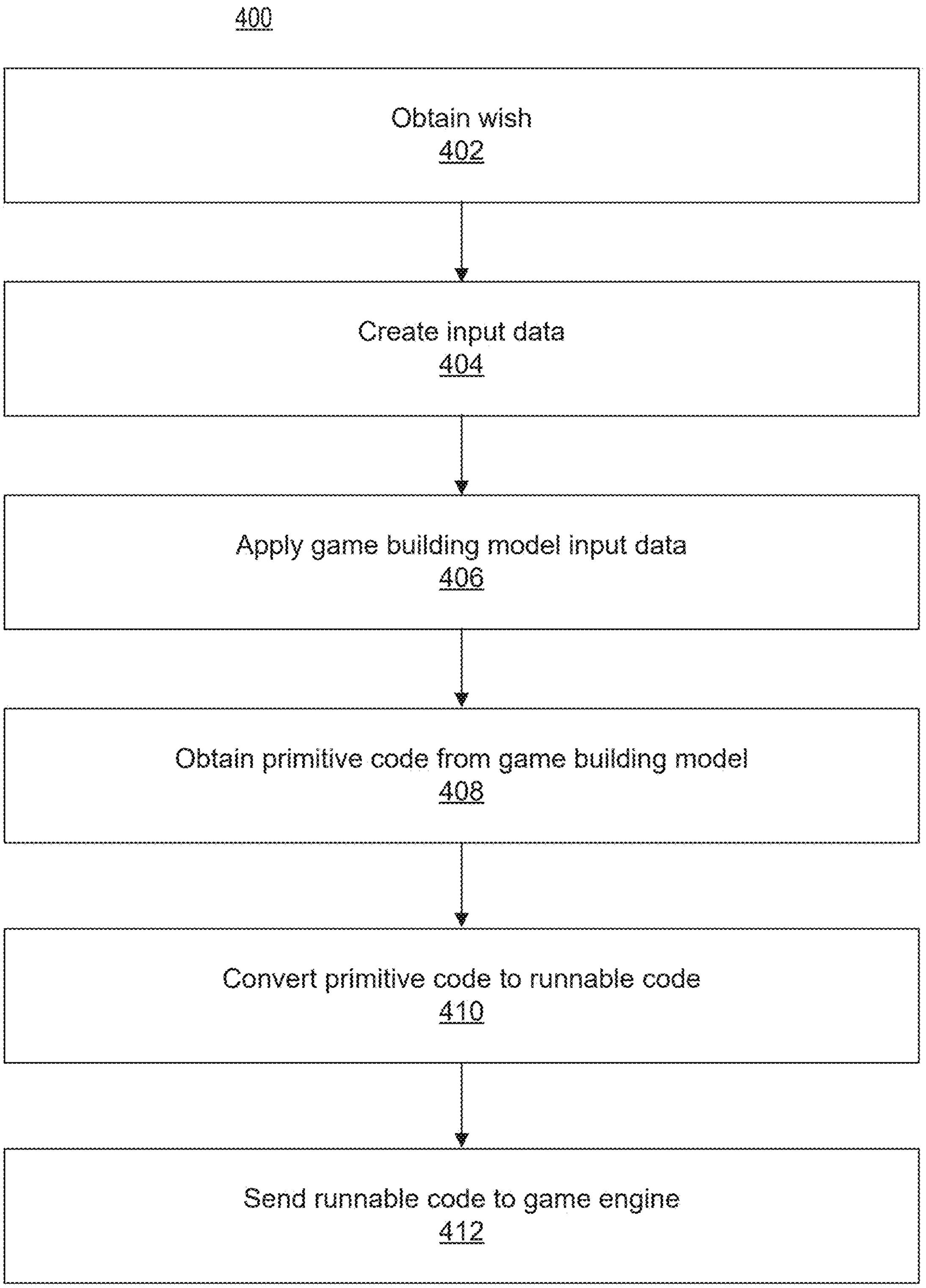
FIG. 4 illustrates a flow diagram showing steps involved in generating game data based on a wish, according to an embodiment of the disclosed technology.

FIG. 4 illustrates a flow diagram showing a process 400 for generating game content based on a wish, according to an embodiment of the disclosed technology. The content building engine 116 employs the process 400 as part of user-game creation via the computing device 104. In some embodiments, the content building engine 116 performs additional or alternative steps to those shown in FIG. 4 and/or uses additional or alternative modules to those described in relation to FIG. 2 to perform the process 400.

In particular, the wish engine 204 obtains 402 a wish 302 via an input to the computing device 104. The wish 302 comprises text, audio, content, and/or requests. The wish engine 204 parses the wish 302 into granular elements and granular actions. In some embodiments, the wish engine 204 parses the wish 302 into sub-wishes and each sub-wish into granular elements and granular actions. The wish engine 204 retrieves an index of tools associated with primitive code stored in the ontology database 212. The wish engine creates 404 input data 304 comprising the granular elements, granular actions, and index. The wish engine 204 uses RAG in association with the input data to retrieve example data from the example database 214. The wish engine 204 includes the example data in the input data with the granular elements, granular actions, and index. In some embodiments, the wish engine 204 includes the retrieved example data to the game building model 206 separately from the input data.

The wish engine 204 applies 406 the game building model 206 to the input data 304. The game building model 206 is an AI model trained to generate primitive code for game content based on input data created from a wish 302. In some embodiments, the game building model 206 includes one or more sub-models, each trained to generate primitive code for entities 306, properties 308, events 310, and implementations 312. The wish engine 204 obtains 408 primitive code representing game content from the game building model 206 and inputs the primitive code to the assembler 210. The assembler 210 converts 410 the primitive code into executable code (e.g., to byte data). The assembler 210 sends 412 the executable code to a GBRE or game engine to be used for game content.

In some embodiments, the process 400 includes additional or alternative steps to those shown in FIG. 4. For example, the wish engine 204 is enabled to receive feedback from the computing device 104 regarding game content described by the executable code. The wish engine 204 stores the executable code in association with the feedback in the example database 214. The wish engine 204 trains the game building model 206 on the executable code and feedback stored in the example database 214 whenever new executable code is added to the example database 214, at periodic intervals, or upon receiving a request for retaining of the game building model 206 received at the computing device 104.

Figure 5:
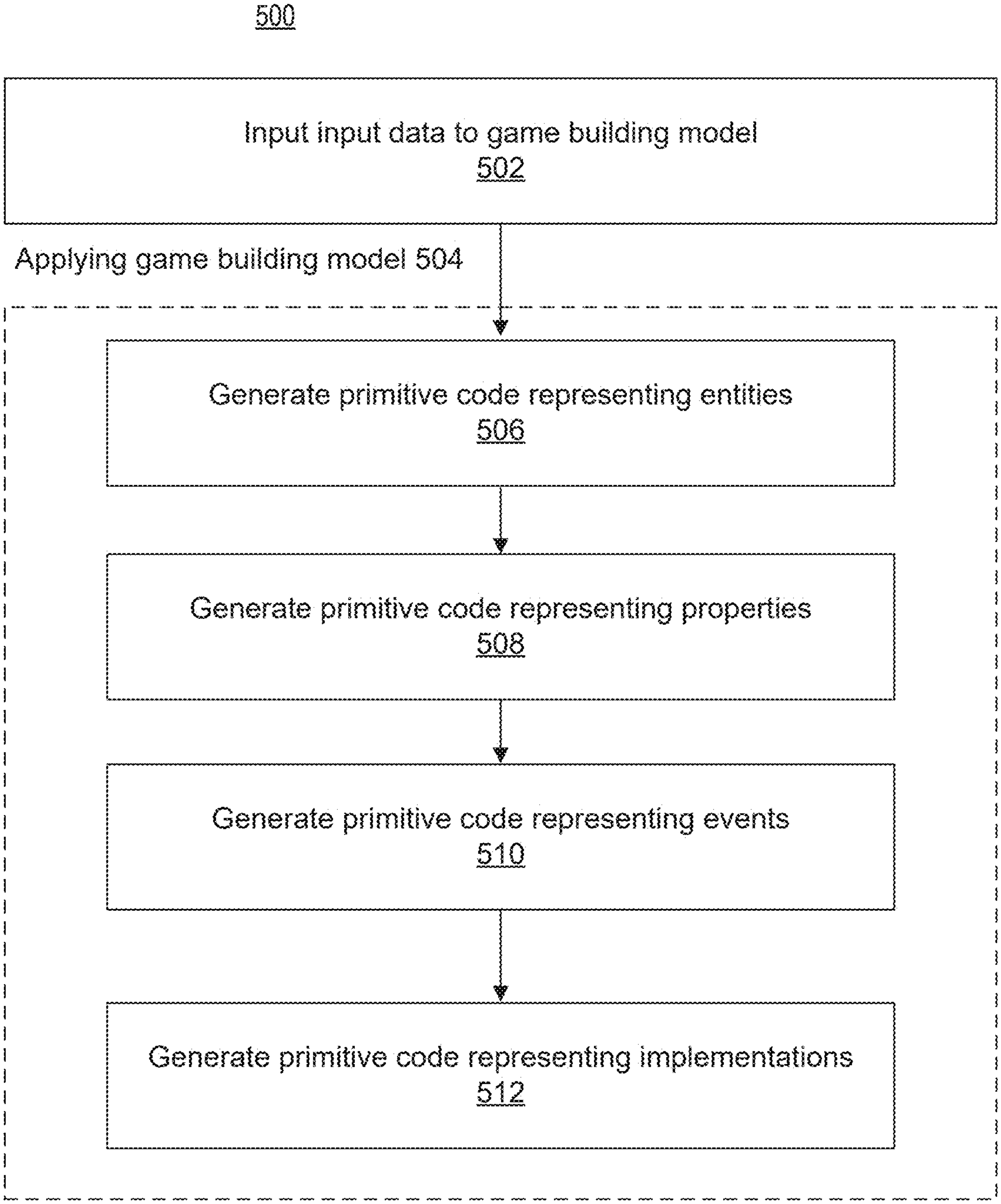
FIG. 5 illustrates a flow diagram showing steps involved in generating primitive code, according to an embodiment of the disclosed technology.

FIG. 5 illustrates a flow diagram showing a process 500 for generating primitive code, according to an embodiment of the disclosed technology. The content building engine 116 employs the process 500 as part of generating game content at the computing device 104. In some embodiments, the content building engine 116 performs additional or alternative steps to those shown in FIG. 5 and/or uses additional or alternative modules to those described in relation to the content building engine 116 of FIG. 2 to perform the process 500.

In particular, the wish engine 204 inputs 502 the input data 304 described above to the game building model 206. During its application 504, the game building model 206 generates 506 primitive code representative of entities 306, generates 508 primitive code representative of properties 308, generates 510 primitive code representative of events 310, and generates 512 primitive code representative of implementations 312. In some embodiments, the game building model 206 generates the entities 306, properties 308, events 310, and implementations 312 in a different order than that shown in FIG. 5.

In some embodiments, the process 500 includes additional or alternative steps to those shown in FIG. 5. For example, the wish engine 204 is enabled to receive feedback from the computing device 104 regarding game content described by the executable code and store the executable code in association with the feedback in the example database 214. The wish engine 204 trains each sub-model separately on the executable code and feedback stored in the example database 214.

Figure 6:
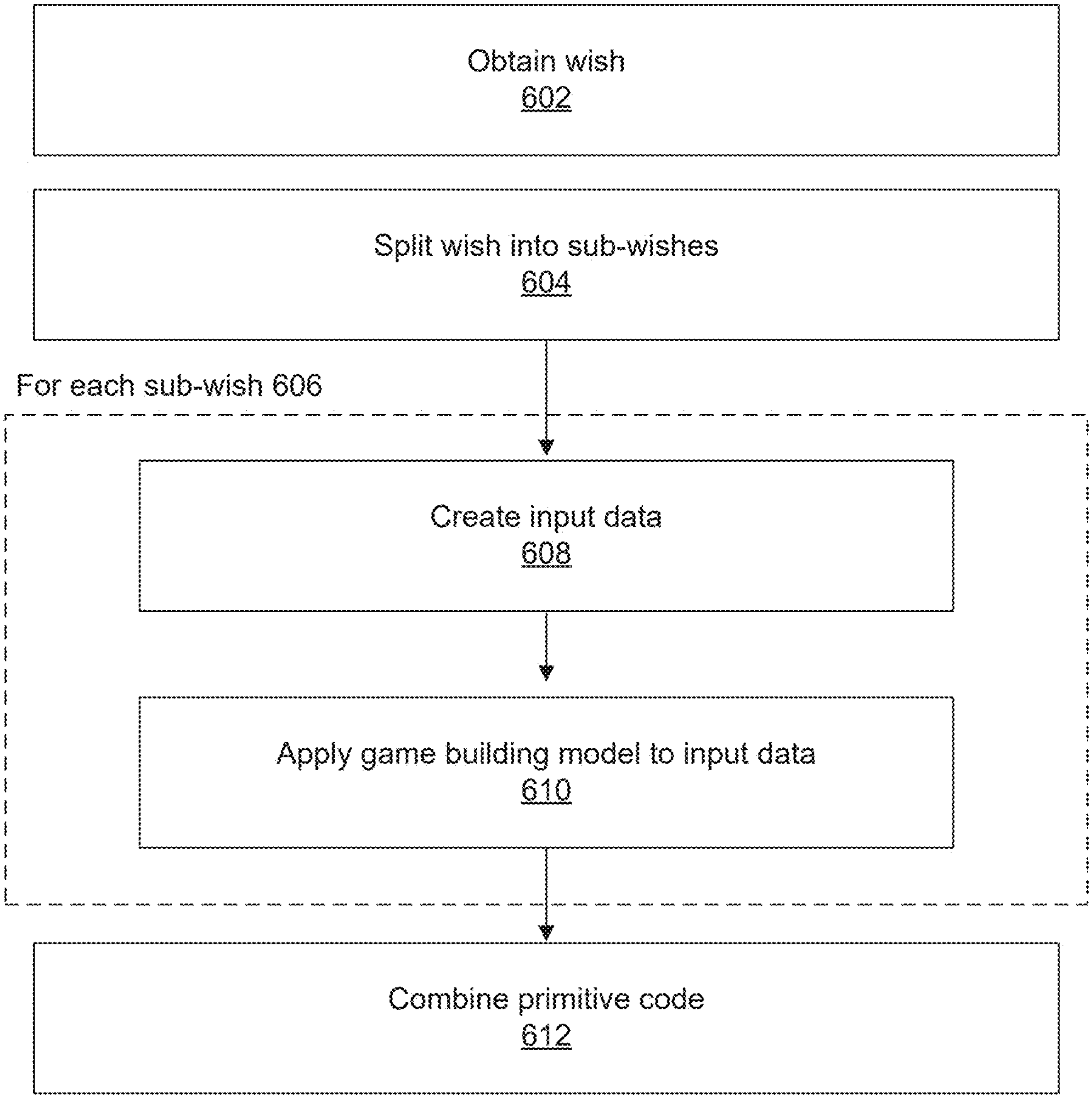
FIG. 6 illustrates a flow diagram showing steps involved in generating game data for a set of sub-wishes, according to an embodiment of the disclosed technology.

FIG. 6 illustrates a flow diagram showing a process 600 for generating primitive code for a set of sub-wishes, according to an embodiment of the disclosed technology. The content building engine 116 employs the process 600 as part of user-game creation via the computing device 104. In some embodiments, the content building engine 116 performs additional or alternative steps to those shown in FIG. 6 and/or uses additional or alternative modules to those described in relation to FIG. 2 to perform the process 600.

In particular, the wish engine 204 obtains 602 a wish 302 input to the computing device 104. The wish engine 204 parses the wish 302 and determines that the wish 302 includes other wishes (e.g., sub-wishes). The wish engine 204 splits 604 the wish 302 into a set of sub-wishes. For example, the wish engine 204 splits a wish 302 for "a fairy riding a unicorn into a field of daisies" into the sub-wishes "fairy," "unicorn," and "field of daisies," which the wish engine 204 further splits into sub-wishes for a "field" and "daisies." In some embodiments, the wish engine 204 applies an AI model trained to parse sub-wishes from a wish 302, or the wish engine 204 splits the wish 302 into phrases that each include one noun, by conjunctions, by verbs, or by prepositions.

For each sub-wish 606, the wish engine 204 creates 608 input data 304 for the sub-wish using granular elements and granular actions parsed from the sub-wish and an index of tools with primitive code stored in the ontology database 212. The wish engine 204 applies 610 the game building model 206 to the input data 304 for each sub-wish. In some embodiments, the wish engine 204 performs these steps for each sub-wish subsequently. In other embodiments, the wish engine 204 performs the steps for each sub-wish in parallel. The wish engine 204 combines 612 the primitive code output by the game building model 206 for each sub-wish. For example, the wish engine 204 appends the primitive code for each sub-wish into a single set of primitive code or uses an AI model trained to combine primitive code together for game content generation. The wish engine 204 sends the combined primitive code to the assembler 210.

In some embodiments, the process 600 includes additional or alternative steps to those shown in FIG. 6. For example, the wish engine 204 is enabled to input the sub-wishes in parallel at each sub-model in the game building model 206 and combine the primitive code for the sub-wishes together before input to the next sub-model. The wish engine 204 trains each sub-model separately on the executable code and feedback stored in the example database 214.

Computing Platform

Figure 7:
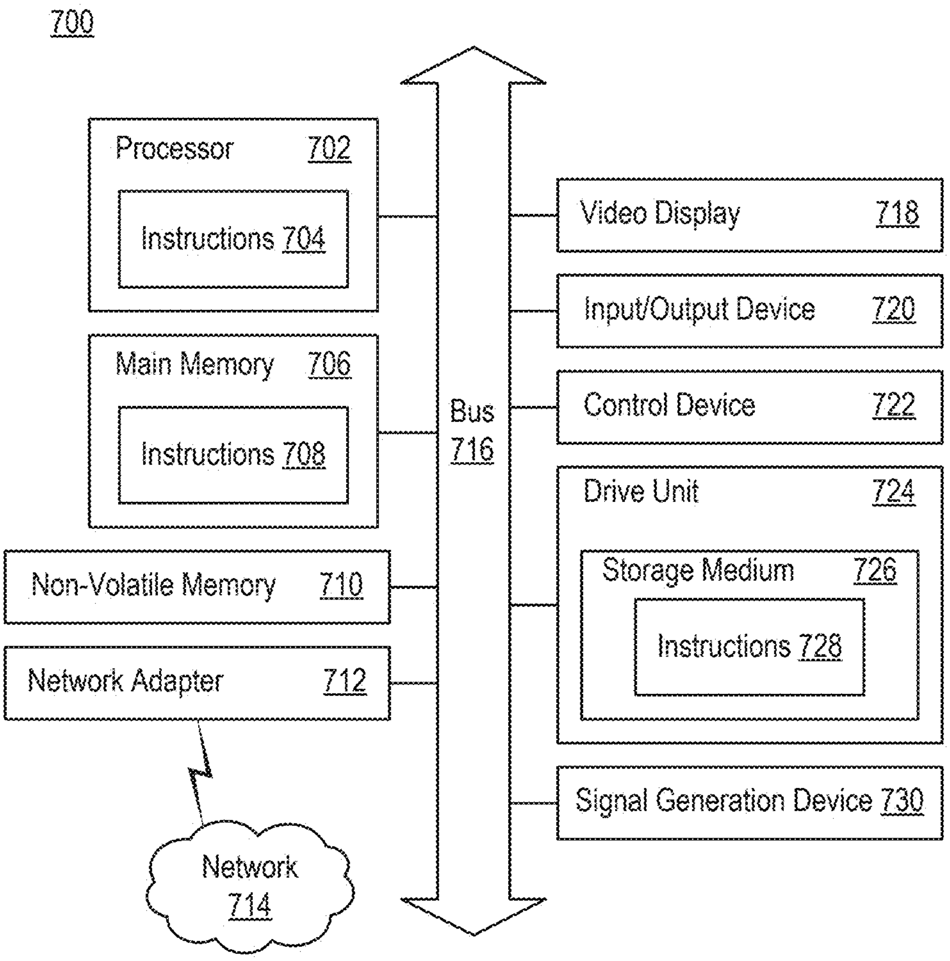
FIG. 7 depicts a diagrammatic representation of a machine in the example form of a computer system within a set of instructions, causing the machine to perform any one or more of the methodologies discussed herein, to be executed.

FIG. 7 is a block diagram illustrating an example computer system 700, in accordance with one or more embodiments. In some embodiments, components of the example computer system 700 are used to implement the software platforms described herein. At least some operations described herein can be implemented on the computer system 700.

In some embodiments, the computer system 700 includes one or more central processing units ("processors") 702, main memory 706, non-volatile memory 710, network adapters 712 (e.g., network interface), video displays 718, input/output devices 720, control devices 722 (e.g., keyboard and pointing devices), drive units 724 including a storage medium 726, and a signal generation device 730 that are communicatively connected to a bus 716. The bus 716 is illustrated as an abstraction that represents one or more physical buses and/or point-to-point connections that are connected by appropriate bridges, adapters, or controllers. The bus 716, therefore, includes a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 794 bus (also referred to as "Firewire").

In some embodiments, the computer system 700 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 700.

While the main memory 706, non-volatile memory 710, and storage medium 726 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 728. The term "machine-readable medium" and "storage medium" shall also be taken to include any medium that is capable of storing, encoding, or carrying a set of instructions for execution by the computer system 700. In some embodiments, the non-volatile memory 710 or the storage medium 726 is a non-transitory, computer-readable storage medium storing computer instructions, which is executable by the one or more "processors" 702 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 704, 708, 728) set at various times in various memory and storage devices in a computer device. When read and executed by the one or more processors 702, the instruction(s) cause the computer system 700 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 710, floppy and other removable disks, hard disk drives, optical discs (e.g., compact disc read-only memory (CD-ROMS), digital versatile discs (DVDs)), and transmission-type media such as digital and analog communication links.

The network adapter 712 enables the computer system 700 to mediate data in a network 714 with an entity that is external to the computer system 700 through any communication protocol supported by the computer system 700 and the external entity. The network adapter 712 includes a network adapter card, a wireless network interface card, a router, an access point, a wireless router, a switch, a multi-layer switch, a protocol converter, a gateway, a bridge, a bridge router, a hub, a digital media receiver, and/or a repeater.

In some embodiments, the network adapter 712 includes a firewall that governs and/or manages permission to access proxy data in a computer network and tracks varying levels of trust between different machines and/or applications. The firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some embodiments, the firewall additionally manages and/or has access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example AI system 800 illustrated and described in more detail with reference to FIG. 8.

AI System

Figure 8:
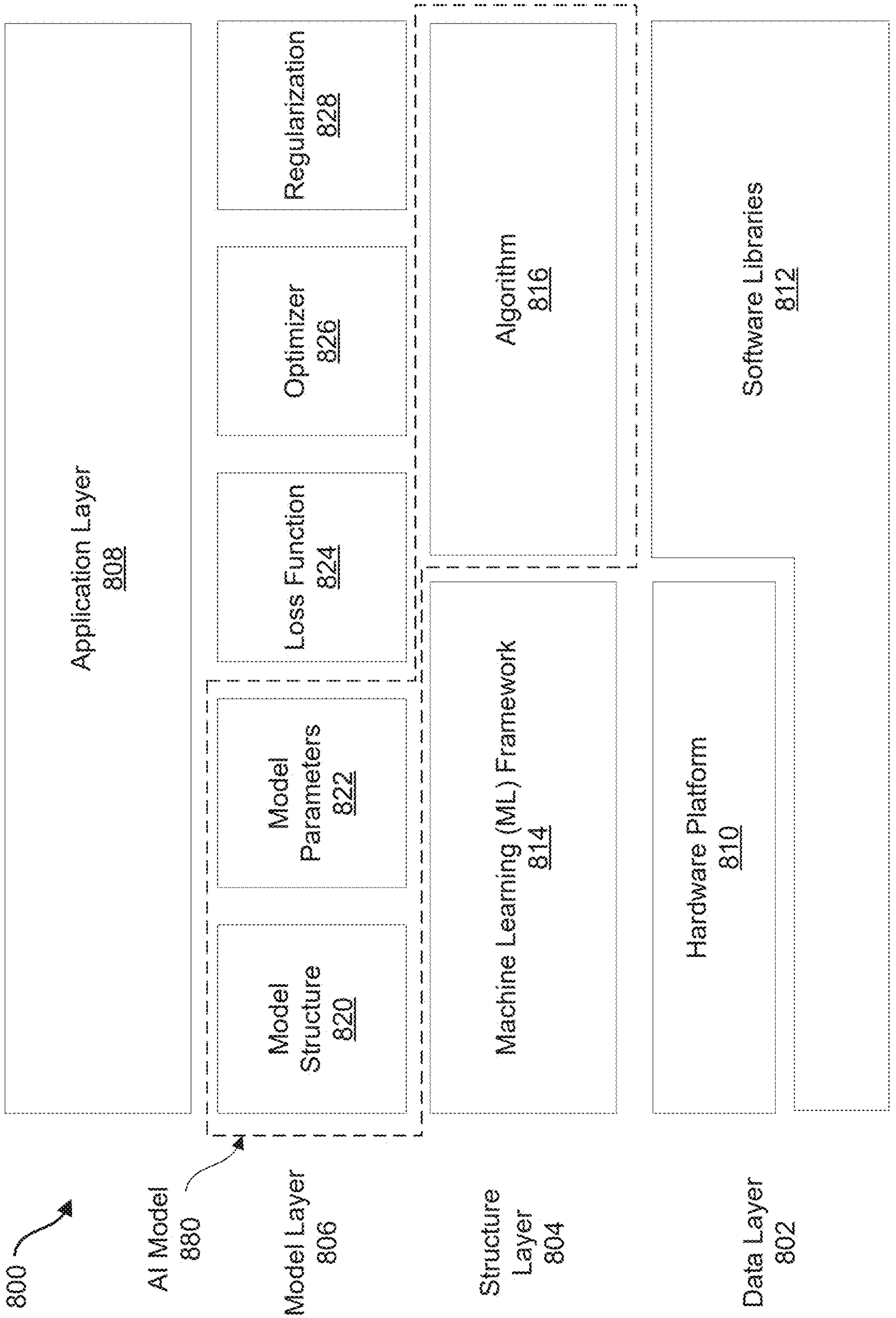
FIG. 8 illustrates a high-level block diagram of an example AI system, according to an embodiment of the disclosed technology.

FIG. 8 illustrates a high-level block diagram of an example AI system, according to an embodiment of the disclosed technology. The AI system 800 is implemented using components of the example computer system 700 illustrated and described in more detail with reference to FIG. 7. Likewise, embodiments of the AI system 800 include different and/or additional components or can be connected in different ways.

In some embodiments, as shown in FIG. 8, the AI system 800 includes a set of layers, which conceptually organize elements within an example network topology for the AI system's architecture to implement a particular AI model 880. Generally, an AI model 880 is a computer-executable program implemented by the AI system 800 that analyses data to make predictions. Information passes through each layer of the AI system 800 to generate outputs for the AI model 880. The layers include a data layer 802, a structure layer 804, a model layer 806, and an application layer 808. The algorithm 816 of the structure layer 804 and the model structure 820 and model parameters 822 of the model layer 806 together form the example AI model 880. The optimizer 826, loss function engine 824, and regularization engine 828 work to refine and optimize the AI model 880, and the data layer 802 provides resources and support for the application of the AI model 880 by the application layer 808.

The data layer 802 acts as the foundation of the AI system 800 by preparing data for the AI model 880. As shown, in some embodiments, the data layer 802 includes two sub-layers: a hardware platform 810 and one or more software libraries 812. The hardware platform 810 is designed to perform operations for the AI model 880 and includes computing resources for storage, memory, logic, and networking, such as the resources described in relation to FIG. 3A and FIG. 3B. The hardware platform 810 processes amounts of data using one or more servers. The servers can perform back-end operations such as matrix calculations, parallel calculations, machine learning (ML) training, and the like. Examples of servers used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 810 includes Infrastructure as a Service (IaaS) resources, which are computing resources (e.g., servers, memory, etc.) offered by a cloud services provider. In some embodiments, the hardware platform 810 includes computer memory for storing data about the AI model 880, application of the AI model 880, and training data for the AI model 880. In some embodiments, the computer memory is a form of random-access memory (RAM), such as dynamic RAM, static RAM, and non-volatile RAM.

In some embodiments, the software libraries 812 are thought of as suites of data and programming code, including executables, used to control the computing resources of the hardware platform 810. In some embodiments, the programming code includes low-level primitives (e.g., fundamental language elements) that form the foundation of one or more low-level programming languages such that servers of the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI system 800 include Intel Math Kernel Library, Nvidia cuDNN, Eigen, and Open BLAS.

In some embodiments, the structure layer 804 includes an ML framework 814 and an algorithm 816. The ML framework 814 can be thought of as an interface, library, or tool that allows users to build and deploy the AI model 880. In some embodiments, the ML framework 814 includes an open-source library, an application programming interface (API), a gradient-boosting library, an ensemble method, and/or a deep learning toolkit that works with the layers of the AI system to facilitate development of the AI model 880. For example, the ML framework 814 distributes processes for the application or training of the AI model 880 across multiple resources in the hardware platform 810. In some embodiments, the ML framework 814 also includes a set of pre-built components that have the functionality to implement and train the AI model 880 and allow users to use pre-built functions and classes to construct and train the AI model 880. Thus, the ML framework 814 can be used to facilitate data engineering, development, hyperparameter tuning, testing, and training for the AI model 880. Examples of ML frameworks 814 that can be used in the AI system 800 include TensorFlow, PyTorch, scikit-learn, Keras, Caffe, LightGBM, Random Forest, and Amazon Web Services.

In some embodiments, the algorithm 816 is an organized set of computer-executable operations used to generate output data from a set of input data and can be described using pseudocode. In some embodiments, the algorithm 816 includes complex code that allows the computing resources to learn from new input data and create new/modified outputs based on what was learned. In some embodiments, the algorithm 816 builds the AI model 880 through being trained while running computing resources of the hardware platform 810. The training allows the algorithm 816 to make predictions or decisions without being explicitly programmed to do so. Once trained, the algorithm 816 runs at the computing resources as part of the AI model 880 to make predictions or decisions, improve computing resource performance, or perform tasks. The algorithm 816 is trained using supervised learning, unsupervised learning, semi-supervised learning, and/or reinforcement learning.

The application layer 808 describes how the AI system 800 is used to solve problems or perform tasks. In an example implementation, the application layer 808 includes the game building model 206.

As an example, to train an AI model 880 that is intended to model human language (also referred to as a language model), the data layer 802 is a collection of text documents referred to as a text corpus (or simply referred to as a corpus). The corpus represents a language domain (e.g., a single language), a subject domain (e.g., scientific papers), and/or encompasses another domain or domains, be they larger or smaller than a single language or subject domain. For example, a relatively large, multilingual, and non-subject-specific corpus is created by extracting text from online web pages and/or publicly available social media posts. In some embodiments, data layer 802 is annotated with ground truth labels (e.g., each data entry in the training dataset is paired with a label) or unlabeled.

Training an AI model 880 generally involves inputting into an AI model 880 (e.g., an untrained ML model) data layer 802 to be processed by the AI model 880, processing the data layer 802 using the AI model 880, collecting the output generated by the AI model 880 (e.g., based on the inputted training data), and comparing the output to a desired set of target values. If the data layer 802 is labeled, the desired target values, in some embodiments, are, e.g., the ground truth labels of the data layer 802. If the data layer 802 is unlabeled, the desired target value is, in some embodiments, a reconstructed (or otherwise processed) version of the corresponding AI model 880 input (e.g., in the case of an autoencoder) or is a measure of some target observable effect on the environment (e.g., in the case of a reinforcement learning agent). The parameters of the AI model 880 are updated based on a difference between the generated output value and the desired target value. For example, if the value outputted by the AI model 880 is excessively high, the parameters are adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the AI model 880 typically is to minimize a loss function or maximize a reward function.

In some embodiments, the data layer 802 is a subset of a larger dataset. For example, a dataset is split into three mutually exclusive subsets: a training set, a validation (or cross-validation) set, and a testing set. The three subsets of data, in some embodiments, are used sequentially during AI model 880 training. For example, the training set is first used to train one or more ML models, each AI model 880, e.g., having a particular architecture, having a particular training procedure, being describable by a set of model hyperparameters, and/or otherwise being varied from the other of the one or more ML models. The validation (or cross-validation) set, in some embodiments, is then used as input data into the trained ML models to, e.g., measure the performance of the trained ML models and/or compare performance between them. In some embodiments, where hyperparameters are used, a new set of hyperparameters is determined based on the measured performance of one or more of the trained ML models, and the first step of training (i.e., with the training set) begins again on a different ML model described by the new set of determined hyperparameters. These steps are repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) begins in some embodiments. The output generated from the testing set, in some embodiments, is compared with the corresponding desired target values to give a final assessment of the trained ML model's accuracy. Other segmentations of the larger dataset and/or schemes for using the segments for training one or more ML models are possible.

Backpropagation is an algorithm for training an AI model 880. Backpropagation is used to adjust (also referred to as update) the value of the parameters in the AI model 880, with the goal of optimizing the objective function. For example, a defined loss function is calculated by forward propagation of an input to obtain an output of the AI model 880 and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. In some embodiments, other techniques for learning the parameters of the AI model 880 are used. The process of updating (or learning) the parameters over many iterations is referred to as training. In some embodiments, training is carried out iteratively until a convergence condition is met (e.g., a predefined maximum number of iterations has been performed, or the value outputted by the AI model 880 is sufficiently converged with the desired target value), after which the AI model 880 is considered to be sufficiently trained. The values of the learned parameters are then fixed, and the AI model 880 is then deployed to generate output in real-world applications (also referred to as "inference").

In some examples, a trained ML model is fine-tuned, meaning that the values of the learned parameters are adjusted slightly in order for the ML model to better model a specific task. Fine-tuning of an AI model 880 typically involves further training the ML model on a number of data samples (which may be smaller in number/cardinality than those used to train the model initially) that closely target the specific task. For example, an AI model 880 for generating natural language that has been trained generically on publicly available text corpora is, e.g., fine-tuned by further training using specific training samples. In some embodiments, the specific training samples are used to generate language in a certain style or a certain format. For example, the AI model 880 is trained to generate a blog post having a particular style and structure with a given topic.

Some concepts in ML-based language models are now discussed. It may be noted that while the term "language model" has been commonly used to refer to an ML-based language model, there could exist non-ML language models. In the present disclosure, the term "language model" may be used as shorthand for an ML-based language model (i.e., a language model that is implemented using a neural network or other ML architecture) unless stated otherwise. For example, unless stated otherwise, the "language model" encompasses LLMs.

In some embodiments, the language model uses a neural network (typically a DNN) to perform NLP tasks. A language model is trained to model how words relate to each other in a textual sequence based on probabilities. In some embodiments, the language model contains hundreds of thousands of learned parameters, or in the case of a large language model (LLM), the LLM contains millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Although a general transformer architecture for a language model and the model's theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that is considered to be an encoder-only language model. A decoder-only language model accepts embeddings as input and uses auto-regression to generate an output text sequence. Transformer-XL and GPT-type models are language models that are considered to be decoder-only language models.

Because GPT-type language models tend to have a large number of parameters, these language models are considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some embodiments, such as, for example, potentially in the case of a cloud-based language model, a remote language model is hosted by a computer system that includes a plurality of cooperating (e.g., cooperating via a network) computer systems that are in, for example, a distributed arrangement. Notably, a remote language model employs a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real-time or near real-time) can require the use of a plurality of processors/cooperating computing devices as discussed above.

In some embodiments, inputs to an LLM are referred to as a prompt, which is a natural language input that includes instructions to the LLM to generate a desired output. In some embodiments, a computer system generates a prompt that is provided as input to the LLM via the LLM's API. As described above, the prompt is processed or pre-processed into a token sequence prior to being provided as input to the LLM via the LLM's API. A prompt includes one or more examples of the desired output, which provides the LLM with additional information to enable the LLM to generate output according to the desired output. Additionally or alternatively, the examples included in a prompt provide inputs (e.g., example inputs) corresponding to/as can be expected to result in the desired outputs provided. A oneshot prompt refers to a prompt that includes one example, and a few-shot prompt refers to a prompt that includes multiple examples. A prompt that includes no examples is referred to as a zero-shot prompt.

In some embodiments, the llama2 is used as a large language model. Llama2 is a large language model based on an encoder-decoder architecture, which can simultaneously perform text generation and text understanding. The llama2 selects or trains proper pre-training corpus, pre-training targets, and pre-training parameters according to different tasks and fields and adjusts a large language model on the basis so as to improve the performance of the large language model under a specific scene.

In some embodiments, the Falcon40B is used as a large language model, which is a causal decoder-only model. During training, the model predicts the subsequent tokens with a causal language modeling task. The model applies rotational positional embeddings in the model's transformer model and encodes the absolution positional information of the tokens into a rotation matrix.

In some embodiments, the Claude is used as a large language model, which is an autoregressive model trained on a large text corpus unsupervised.

Consequently, alternative language and synonyms can be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

We claim:

1. A method of generating game content, the method comprising:

receiving a wish from a user requesting desired game content for a game, wherein the wish is a user input including a natural language description of the desired game content;

splitting the wish into a first sub-wish and a second sub-wish, wherein the first sub-wish includes content from the wish requesting a first part of the desired game content and the second sub-wish includes content from the wish requesting a second part of the desired game content;

creating a first set of input data based on the first sub-wish, wherein the first set of input data includes at least one of a first granular element or a first granular action;

creating a second set of input data based on the second sub-wish, wherein the second set of input data includes at least one of a second granular element or a second granular action;

directing, using the first set of input data, a game building model to retrieve a first basic tool from an ontology database, wherein the game building model includes (i) an entity sub-model configured to generate primitive code representing one or more entities, the one or more entities being visual objects included in the desired game content, (ii) a property sub-model configured to generate primitive code representing properties, a property being a basic characteristic associated with a first entity of the one or more entities, (iii) an event sub-model configured to generate primitive code representing events, an event being an action performed by a second entity of the one or more entities, and (iv) an implementation sub-model configured to generate primitive code representing implementations, an implementation being an effect of the event on a third entity of the one or more entities, and wherein the first basic tool is associated with first primitive code for implementing at least one of a first simple step to be taken or a first simple element to be included when the desired game content is generated;

in parallel to directing the game building model to retrieve the first basic tool, directing, using the second set of input data, the game building model to retrieve a second basic tool from the ontology database, wherein the second basic tool is associated with second primitive code for implementing at least one of a second simple step to be taken or a second simple element to be included when the desired game content is generated;

retrieving, using a retrieval-augmented generation (RAG) framework, information from at least one of an example database or the ontology database, wherein the example database contains previously generated game content;

providing the information to the game building model, wherein the game building model uses the information as context for generating representative primitive code;

receiving, from the game building model, the representative primitive code representing the desired game content, wherein the representative primitive code is a combination of the first primitive code and the second primitive code;

converting the representative primitive code into executable code, wherein the executable code is byte code that is associated with source code used by a game engine to generate the desired game content; and executing the executable code by the game engine.

2. The method of claim 1, wherein the representative primitive code includes at least one of:

a representation of the first entity;

a representation of the property;

a representation of the event; or a representation of the implementation.

3. The method of claim 1, wherein at least one of the first set of input data or the second set of input data further includes an index of tools associated with one or more basic tools stored in the ontology database.

4. A non-transitory, computer-readable storage medium comprising instructions recorded thereon, wherein the instructions, when executed by at least one data processor of a system, cause the system to:

receive a wish from a user requesting desired game content for a game, wherein the wish is a user input including a natural language description of the desired game content;

split the wish into a first sub-wish and a second sub-wish, wherein the first sub-wish includes content from the wish requesting a first part of the desired game content and the second sub-wish includes content from the wish requesting a second part of the desired game content;

create a first set of input data based on the first sub-wish, wherein the first set of input data includes at least one of a first granular element or a first granular action;

create a second set of input data based on the second sub-wish, wherein the second set of input data includes at least one of a second granular element or a second granular action;

direct, using the first set of input data, a game building model to retrieve a first basic tool from an ontology database, wherein the game building model includes (i) an entity sub-model configured to generate primitive code representing one or more entities, the one or more entities being visual objects included in the desired game content, (ii) a property sub-model configured to generate primitive code representing properties, a property being a basic characteristic associated with a first entity of the one or more entities, (iii) an event sub-model configured to generate primitive code representing events, an event being an action performed by a second entity of the one or more entities, and (iv) an implementation sub-model configured to generate primitive code representing implementations, an implementation being an effect of the event on a third entity of the one or more entities, and wherein the first basic tool is associated with first primitive code for implementing at least one of a simple step to be taken or a simple element to be included when the desired game content is generated;

in parallel to directing the game building model to retrieve the first basic tool, direct, using the second set of input data, the game building model to retrieve a second basic tool from the ontology database, wherein the second basic tool is associated with second primitive code for implementing at least one of a second simple step to be taken or a second simple element to be included when the desired game content is generated;

retrieve, using a retrieval-augmented generation (RAG) framework, information from at least one of an example database or the ontology database, wherein the example database contains previously generated game content;

provide the information to the game building model, wherein the game building model uses the information as context for generating representative primitive code;

receive, from the game building model, the representative primitive code representing the desired game content, wherein the representative primitive code is based on the first primitive code and the second primitive code;

convert the representative primitive code into executable code, wherein the executable code is byte code that is associated with source code used by a game engine to generate the desired game content; and execute the executable code by the game engine.

5. The non-transitory, computer-readable storage medium of claim 4, wherein the representative primitive code includes at least one of:

a representation of the first entity;

a representation of the property;

a representation of the event; or a representation of the implementation.

6. The non-transitory, computer-readable storage medium of claim 4, wherein the instructions further cause the system to:

receive feedback from the user indicating a performance of the executable code;

store the feedback in the example database, wherein the feedback is associated with the retrieved information; and update the game building model based on the feedback.

7. The non-transitory, computer-readable storage medium of claim 4, wherein at least one of the first set of input data or the second set of input data further includes an index of tools associated with one or more basic tools stored in the ontology database.

8. A system comprising:

at least one hardware processor; and at least one non-transitory memory storing instructions, which, when executed by the at least one hardware processor, cause the system to:

receive a wish from a user requesting desired game content for a game, wherein the wish is a user input including a natural language description of the desired game content;

split the wish into a first sub-wish and a second sub-wish, wherein the first sub-wish includes content from the wish requesting a first part of the desired game content and the second sub-wish includes content from the wish requesting a second part of the desired game content;

create a first set of input data based on the first sub-wish, wherein the first set of input data includes at least one of a first granular element or a first granular action;

create a second set of input data based on the second sub-wish, wherein the second set of input data includes at least one of a second granular element or a second granular action;

direct, using the first set of input data, a game building model to retrieve a first basic tool from an ontology database, wherein the game building model includes (i) an entity sub-model configured to generate primitive code representing one or more entities, the one or more entities being visual objects included in the desired game content, (ii) a property sub-model configured to generate primitive code representing properties, a property being a basic characteristic associated with a first entity of the one or more entities, (iii) an event sub-model configured to generate primitive code representing events, an event being an action performed by a second entity of the one or more entities, and (iv) an implementation sub-model configured to generate primitive code representing implementations, an implementation being an effect of the event on a third entity of the one or more entities, and wherein the first basic tool is associated with first primitive code for implementing at least one of a simple step to be taken or a simple element to be included when the desired game content is generated;

in parallel to directing the game building model to retrieve the first basic tool, direct, using the second set of input data, the game building model to retrieve a second basic tool from the ontology database, wherein the second basic tool is associated with second primitive code for implementing at least one of a second simple step to be taken or a second simple element to be included when the desired game content is generated;

retrieve, using a retrieval-augmented generation (RAG) framework, information from at least one of an example database or the ontology database, wherein the example database contains previously generated game content;

provide the information to the game building model, wherein the game building model uses the information as context for generating representative primitive code;

receive, from the game building model, the representative primitive code representing the desired game content, wherein the representative primitive code is based on the first primitive code and the second primitive code;

convert the representative primitive code into executable code; and execute the executable code by a game engine.

9. The system of claim 8, wherein the representative primitive code includes at least one of:

a representation of the first entity;

a representation of the property;

a representation of the event; or a representation of the implementation.

10. The system of claim 8, further comprising instructions to:

receive feedback from the user indicating a performance of the executable code;

store the feedback in the example database, wherein the feedback is associated with the retrieved information; and update the game building model based on the feedback.

11. The system of claim 8, wherein at least one of the first set of input data or the second set of input data includes at least one of a granular element or a granular action.

12. The system of claim 8, wherein at least one of the first set of input data or the second set of input data further includes an index of tools associated with one or more basic tools stored in the ontology database.

* * * * *